(12) United States Patent
Miyazaki

(10) Patent No.: US 7,675,691 B2
(45) Date of Patent: Mar. 9, 2010

(54) ZOOM LENS SYSTEM AND IMAGING OPTICAL DEVICE EMPLOYING THE SAME

(75) Inventor: Kyoichi Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 97 days.

(21) Appl. No.: 11/996,193

(22) PCT Filed: Jul. 13, 2006

(86) PCT No.: PCT/JP2006/313967
§ 371 (c)(1),
(2), (4) Date: Jan. 18, 2008

(87) PCT Pub. No.: WO2007/010822
PCT Pub. Date: Jan. 25, 2007

(65) Prior Publication Data
US 2009/0109547 A1   Apr. 30, 2009

(30) Foreign Application Priority Data
Jul. 19, 2005 (JP) ............... 2006-208894

(51) Int. Cl.
*G02B 15/14* (2006.01)
(52) U.S. Cl. .................. 359/690; 359/689
(58) Field of Classification Search .......... 359/676, 359/683, 684, 686, 687, 689, 690; 348/240.99–240.3; 396/72–88; *G02B 15/14*
See application file for complete search history.

(56) References Cited

U.S. PATENT DOCUMENTS

| 7,283,310 B2 * | 10/2007 | Hozumi et al. ........ 359/687 |
| 7,333,274 B2 * | 2/2008 | Hozumi ............... 359/687 |
| 2004/0136086 A1 | 7/2004 | Ohtake |
| 2005/0007480 A1 | 1/2005 | Hamano et al. |

FOREIGN PATENT DOCUMENTS

| JP | 2004-212616 | 7/2004 |
| JP | 2004-252204 | 9/2004 |
| JP | 2005-024844 | 1/2005 |
| JP | 2005-242014 | 9/2005 |

\* cited by examiner

*Primary Examiner*—Darryl J Collins
*Assistant Examiner*—Zachary Wilkes
(74) *Attorney, Agent, or Firm*—McDermott Will & Emery LLP

(57) ABSTRACT

A zoom lens system according to the present invention comprises a plurality of lens units, in order from an object side to an image side, including at least: a first lens unit having positive optical power; a second lens unit having negative optical power; and a third lens unit having positive optical power, wherein magnification change is performed by changing an interval between the individual lens units, wherein the second lens unit, in order from the object side to the image side, comprises: a lens element A having negative optical power; a lens element B that has an aspheric surface and has negative optical power; and a lens element C having positive optical power, and wherein the second lens unit satisfies the following conditions (1): $1.85<NdA<2.20$ and (2): $1.88<NdC<2.20$, where NdA is the refractive index to the d-line of the lens element A and NdC is the refractive index to the d-line of the lens element C.

13 Claims, 7 Drawing Sheets

(a) SPHERICAL ABERRATION (mm)
(b) ASTIGMATISM (mm)
(c) DISTORTION (%)
(d) AXIAL CHROMATIC ABERRATION (mm)
(e) MAGNIFICATION CHROMATIC ABERRATION (mm)

ZOOM LENS SYSTEM AND IMAGING OPTICAL DEVICE EMPLOYING THE SAME

RELATED APPLICATIONS

This application is the U.S. National Phase under 35 U.S.C. §371 of International Application No. PCT/JP2006/313967, filed on Jul. 13, 2006, which in turn claims the benefit of Japanese Application No. 2005-208894, filed on Jul. 19, 2005, the disclosures of which Applications are incorporated by reference herein.

TECHNICAL FIELD

The present invention relates to a zoom lens system and an imaging optical device employing the same. In particular, the present invention relates to a zoom lens system suitable for an imaging optical device such as a digital still camera or a digital video camera, as well as to an imaging optical device employing this zoom lens system.

BACKGROUND ART

In recent years, imaging optical devices represented by digital still cameras and digital video cameras (simply referred to as "digital cameras", hereinafter) have spread rapidly. For example, a large number of such digital cameras are commercialized that have the number of recorded-image pixels greater than 5 million. Among these, digital cameras of reduced size and weight are desired in particular.

According to demand for such further size and weight reduction of the imaging optical devices, recently, the following lens systems are proposed (Japanese Laid-Open Patent Publication No. 2004-212616, Japanese Laid-Open Patent Publication No. 2004-252204 and Japanese Laid-Open Patent Publication No. 2005-24844).

Each of the lens systems described in Japanese Laid-Open Patent Publication No. 2004-212616, Japanese Laid-Open Patent Publication No. 2004-252204 and Japanese Laid-Open Patent Publication No. 2005-24844 is a zoom lens system, in order from the object side to the image side, comprises: a first lens unit having positive optical power; a second lens unit having negative optical power; a third lens unit having positive optical power; and a fourth lens unit having positive optical power. Then, the second lens unit is, in order from the object side to the image side, constructed from three lens elements of a first lens element having negative optical power, a second lens element having negative optical power and a third lens element having positive optical power. As such, in each of the lens systems described in Japanese Laid-Open Patent Publication No. 2004-212616, Japanese Laid-Open Patent Publication No. 2004-252204 and Japanese Laid-Open Patent Publication No. 2005-24844, the second lens unit is constructed from minimum lens elements, and size and weight are reduced.

Patent Document 1: Japanese Laid-Open Patent Publication No. 2004-212616

Patent Document 2: Japanese Laid-Open Patent Publication No. 2004-252204

Patent Document 3: Japanese Laid-Open Patent Publication No. 2005-24844

DISCLOSURE OF THE INVENTION

Problems to be Solved by the Invention

Nevertheless, in each of the zoom lens systems described in Japanese Laid-Open Patent Publication No. 2004-212616 and Japanese Laid-Open Patent Publication No. 2004-252204, a refractive index to the d-line of both of the first lens element and the third lens element is less than 1.85, then each radius of curvature of the first lens element and the third lens element becomes relatively small. Then, aberration during refraction becomes large, and aberration performance of the entire lens system is affected by the generation of high order aberration and degraded. This causes the problem that the sensitivity of performance degradation with respect to a fabrication error such as decentering becomes high.

In the zoom lens system described in Japanese Laid-Open Patent Publication No. 2005-24844, a refractive index to the d-line of the first lens element is less than 1.85, and then this causes the same problem as in the above lens systems. Also, because an interval between the second lens element and the third lens element is short, necessary optical power for each of the lens elements becomes larger. As a result, it becomes difficult to decrease the generation of high order aberration, and the sensitivity becomes high. As a measure against such high sensitivity, a center-adjustment assembling method in which lens elements are assembled as well as the center of each lens element is adjusted is usually greatly used. Nevertheless, this causes the problem that production cost increases.

The present invention has been made in order to resolve the problems in the prior art. Objects of the present invention are: to provide a zoom lens system that permits size and weight reduction and cost reduction, shows low sensitivity, and has excellent aberration performance; and to provide an imaging optical device employing the same.

Solution to the Problems

One of the above-mentioned objects is achieved by the following zoom lens system. That is, the present invention relates to (i) a zoom lens system comprising a plurality of lens units, in order from an object side to an image side, including at least:

a first lens unit having positive optical power;

a second lens unit having negative optical power; and a third lens unit having positive optical power, wherein magnification change is performed by changing an interval between the individual lens units, wherein the first lens unit moves relative to an image surface during changing the magnification from a wide-angle side to a telephoto side, wherein the second lens unit, in order from the object side to the image side, comprises:

a lens element A having negative optical power;

a lens element B that has an aspheric surface and has negative optical power; and a lens element C having positive optical power, and wherein the second lens unit satisfies the following conditions (1) and (2):

$$1.85 < NdA < 2.20 \quad (1)$$

$$1.88 < NdC < 2.20 \quad (2)$$

where;
NdA is the refractive index to the d-line of the lens element A, and
NdC is the refractive index to the d-line of the lens element C, and (ii) a zoom lens system comprising a plurality of lens units, in order from an object side to an image side, including at least:
a first lens unit having positive optical power;
a second lens unit having negative optical power; and
a third lens unit having positive optical power, wherein
magnification change is performed by changing an interval between the individual lens units, wherein
the second lens unit once moves to the image side and then moves to the object side with locus of a convex to an image surface during changing the magnification from a wide-angle side to a telephoto side, wherein
the second lens unit, in order from the object side to the image side, comprises:
a lens element A having negative optical power;
a lens element B that has an aspheric surface and has negative optical power; and
a lens element C having positive optical power, and wherein
the second lens unit satisfies the following conditions (1) and (2):

$$1.85 < NdA < 2.20 \tag{1}$$

$$1.88 < NdC < 2.20 \tag{2}$$

where;
NdA is the refractive index to the d-line of the lens element A, and
NdC is the refractive index to the d-line of the lens element C.

Further one of the above-mentioned objects is achieved by the following imaging optical device. That is, the present invention relates to (i) an imaging optical device comprising:
an imaging optical system for forming an optical image of an object; and
an image sensor for converting the optical image formed by the imaging optical system into an electric image signal; wherein
the imaging optical system is a zoom lens system comprising a plurality of lens units, in order from an object side to an image side, including at least:
a first lens unit having positive optical power;
a second lens unit having negative optical power; and
a third lens unit having positive optical power, wherein
magnification change is performed by changing an interval between the individual lens units, wherein
the first lens unit moves relative to an image surface during changing the magnification from a wide-angle side to a telephoto side, wherein
the second lens unit, in order from the object side to the image side, comprises:
a lens element A having negative optical power;
a lens element B that has an aspheric surface and has negative optical power; and
a lens element C having positive optical power, and wherein
the second lens unit satisfies the following conditions (1) and (2):

$$1.85 < NdA < 2.20 \tag{1}$$

$$1.88 < NdC < 2.20 \tag{2}$$

where;
NdA is the refractive index to the d-line of the lens element A, and
NdC is the refractive index to the d-line of the lens element C, and (ii) an imaging optical device comprising:
an imaging optical system for forming an optical image of an object; and
an image sensor for converting the optical image formed by the imaging optical system into an electric image signal; wherein
the imaging optical system is a zoom lens system comprising a plurality of lens units, in order from an object side to an image side, including at least:
a first lens unit having positive optical power;
a second lens unit having negative optical power; and
a third lens unit having positive optical power, wherein
magnification change is performed by changing an interval between the individual lens units, wherein
the second lens unit once moves to the image side and then moves to the object side with locus of a convex to an image surface during changing the magnification from a wide-angle side to a telephoto side, wherein
the second lens unit, in order from the object side to the image side, comprises:
a lens element A having negative optical power;
a lens element B that has an aspheric surface and has negative optical power; and
a lens element C having positive optical power, and wherein
the second lens unit satisfies the following conditions (1) and (2):

$$1.85 < NdA < 2.20 \tag{1}$$

$$1.88 < NdC < 2.20 \tag{2}$$

where;
NdA is the refractive index to the d-line of the lens element A, and
NdC is the refractive index to the d-line of the lens element C.

EFFECT OF THE INVENTION

The present invention realizes, at a low cost, a zoom lens system that has a reduced number of lens elements and a simple construction so as to achieve size and weight reduction, and still shows low sensitivity and has excellent aberration performance, in which the generation of aberration by each lens element is reduced.

The present invention further realizes an imaging optical device that has reduced size and weight as well as a high-performance imaging function.

DESCRIPTION OF THE REFERENCE CHARACTERS

Figure 1:
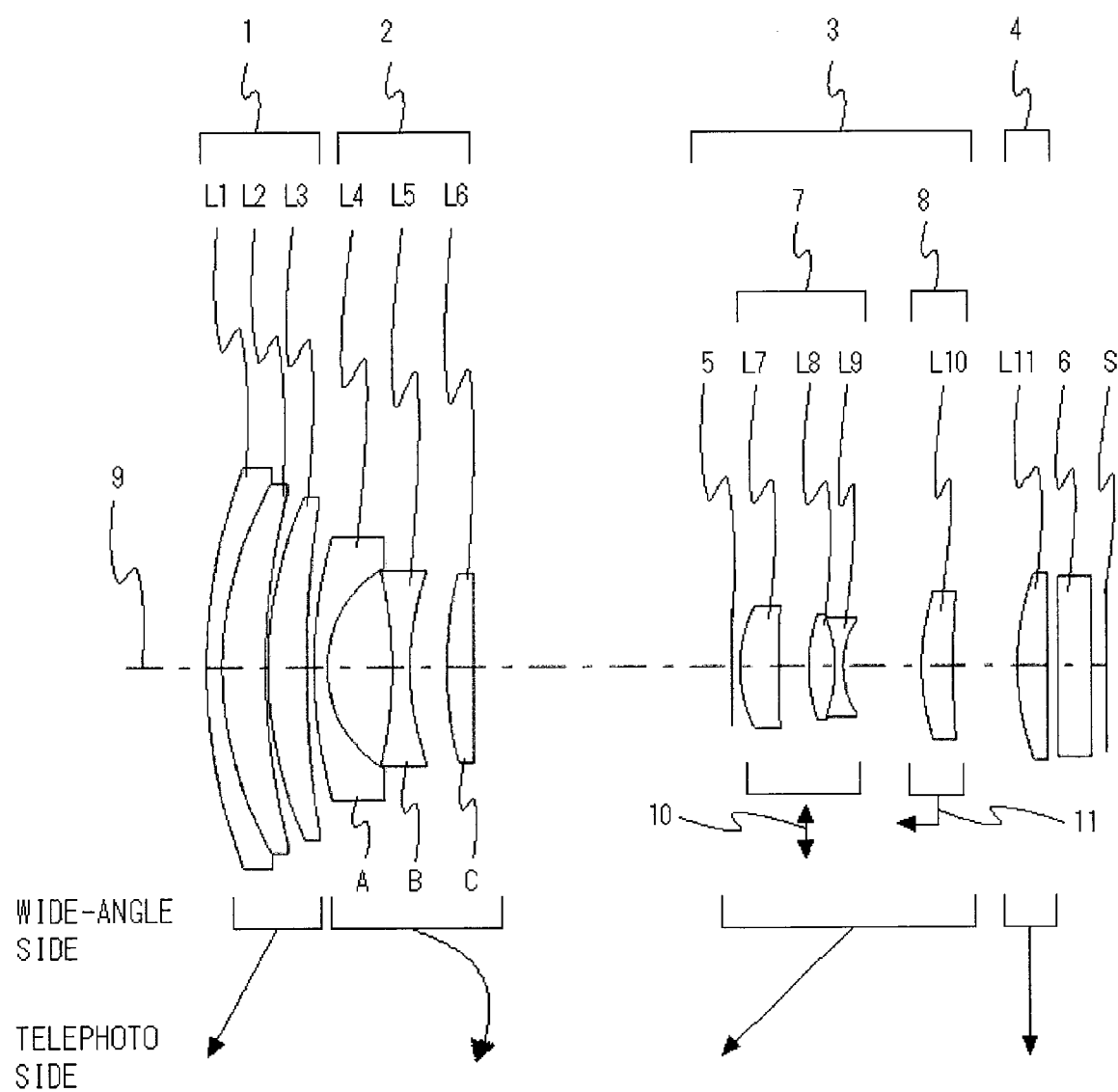
FIG. 1 is an arrangement diagram showing a lens configuration of a zoom lens system according to Embodiment 1 at a wide-angle limit in a normal state.

A, B, C Lens element
S Image surface
1 First lens unit
2 Second lens unit
3 Third lens unit
4 Fourth lens unit
5 Aperture diaphragm
6 Optical low-pass filter
7 Third A lens unit
8 Third B lens unit
9 Optical axis
12 Lens barrel
13 Imaging optical device
14 Stroboscope
15 Optical viewfinder

BEST MODE FOR CARRYING OUT THE INVENTION

The present invention is described below in further detail with reference to embodiments.

Embodiment 1

FIG. 1 is an arrangement diagram showing a lens configuration of a zoom lens system according to Embodiment 1 at a wide-angle limit in a normal state.

As shown in FIG. 1, the zoom lens system according to Embodiment 1, in order from the object side (left-hand side in FIG. 1) to the image side (image surface S side), comprises: a first lens unit 1 having positive optical power; a second lens unit 2 having negative optical power; a third lens unit 3 having positive optical power; and a fourth lens unit 4 having positive optical power. Then, an interval between the individual lens units is changed, and magnification change is performed. On the most object side of the third lens unit 3, an aperture diaphragm 5 is arranged for restricting the optical path. Further, near the image surface S located between the fourth lens unit 4 and the image surface S, an optical low-pass filter 6 is arranged. This optical low-pass filter 6 reduces a folded image generated by sampling of an image sensor such as a CCD or a CMOS arranged on the image surface S, and is formed from transparent parallel plates such as quartz plates. In FIG. 1, each arrow extending from each lens unit indicates a moving path of each lens unit during changing the magnification from the wide-angle side to the telephoto side. Here, the arrow extending from the fourth lens unit 4 indicates that the fourth lens unit 4 is fixed relative to the image surface S during changing the magnification.

Next, specific configurations of individual lens units are described below in detail.

As shown in FIG. 1, the first lens unit 1, in order from the object side to the image side, comprises three lens elements consisting of: a meniscus lens element ("negative meniscus lens element", hereinafter) L1 that has a convex surface facing the object side and that has negative optical power; a meniscus lens element ("positive meniscus lens element", hereinafter) L2 that has a convex surface facing the object side and that has positive optical power; and a positive meniscus lens element L3 with the convex surface facing the object side. The negative meniscus lens element L1 and the positive meniscus lens element L2 are cemented with each other.

Here, when the highest priority is imparted to size and weight reduction in the zoom lens system, it is preferable that the first lens unit is constructed from a single lens element (see Embodiment 3 described later). Nevertheless, in this case, a tendency arises that compensation of chromatic aberration and spherical aberration becomes insufficient in the first lens unit in an isolated state. Thus, a comparatively large (dark) F-number is preferable on the telephoto side. Thus, the number of lens elements constituting the first lens unit is selected appropriately in accordance with the requirement for the F-number on the telephoto side. When the first lens unit is constructed from two lens elements (see Embodiment 2 described later) or three lens elements (the present Embodiment 1), satisfactory compensation of chromatic aberration and spherical aberration is achieved in the first lens unit in an isolated state. Thus, a zoom lens system is realized that has a small (bright) F-number even on the telephoto side and a comparatively high resolution. As such, it is preferable that the first lens unit is constructed from one through three lens elements depending on the required specification.

The second lens unit 2, in order from the object side to the image side, comprises: a negative meniscus lens element L4 (lens element A) with the convex surface facing the object side; a bi-concave shaped lens element ("bi-concave negative lens element", hereinafter) L5 (lens element B) having negative optical power; and a bi-convex shaped lens element ("bi-convex positive lens element", hereinafter) L6 (lens element C) that has high curvature on the object side and that has positive optical power. Here, the lens element A is necessary for the purpose of satisfactory compensation of distortion at a wide-angle limit. Further, the lens element C compensates chromatic aberration and astigmatism of the second lens unit 2. Further, the lens element A and the lens element C are formed from a high refractive index material having a high refractive index Nd to the d-line (see Table 1). By virtue of this, aberration generated by lens elements constituting the second lens unit 2 can be reduced, and aberration can be satisfactorily compensated, and the sensitivity of performance degradation due to decentering of the lens elements constituting the second lens unit 2 can be reduced. In particular, a tendency arises that compensation of spherical aberration and coma aberration becomes insufficient when a zoom lens system is realized having a high magnification and a large aperture as well as reduced size and weight. Therefore, for the purpose of satisfactory compensation of spherical aberration and coma aberration in the second lens unit 2, the image side surface 9 of the lens element B is aspheric.

As such, in the zoom lens system according to Embodiment 1, the second lens unit 2, in order from the object side to the image side, comprises the lens element A having negative optical power, the lens element B that has an aspheric surface and that has negative optical power, and the lens element C having positive optical power. Also, both of the lens element A and the lens element C have a refractive index to the d-line included in the specific high range as shown bellow. Therefore, in Embodiment 1, a zoom lens system can be realized having a reduced number of lens elements and a simple construction so as to achieve size and weight reduction, and still showing low sensitivity and having excellent aberration performance, in which the generation of aberration by each lens element is reduced.

The third lens unit 3, in order from the object side to the image side, comprises an aperture diaphragm 5, a third A lens unit 7 and a third B lens unit 8. Here, the third A lens unit 7 is a blur compensation lens unit capable of moving (being decentered) in a direction (the direction indicated by an arrow 10) perpendicular to the optical axis 9 (the "optical axis" indicates the "optical axis 9", hereinafter) for the purpose of blur compensation. Further, the third B lens unit 8 is a focusing lens unit capable of moving in the optical axis direction (the direction indicated by an arrow 11) with changing the interval relative to the third A lens unit 7 in the optical axis direction for the purpose of focusing adjustment. In the third lens unit 3, driving actuators serving as drive mechanisms are integrated into there.

As such, in the zoom lens system according to Embodiment 1, the third lens unit 3 is divided into two lens units consisting of the third A lens unit 7 and the third B lens unit 8. Then, a blur compensation function is imparted to the third A lens unit 7, while a focal function is imparted to the third B lens unit 8. By virtue of this, a blur compensation drive section and a focusing drive section can be collected that need be controlled with electric power supply. This allows members such as driving actuators to be arranged compactly and efficiently.

Further, in inspection at the time of assembling, the inspection of electric components is collected, and then reduction in the assembling cost is achieved.

Further, in aberration compensation concerning image formation performance, a long overall length is constructed in the third lens unit 3, and then effective vignetting can be achieved. In particular, a satisfactory effect is obtained in aberration compensation, for example, in the case of a zoom lens system that requires a wide view angle at least that corresponding to 28 mm in 35-mm film equivalence.

Further, at the time of accommodation of the lens barrel that holds the lens elements, the interval between the third A lens unit 7 and the third B lens unit 8 vanishes approximately, and then thickness reduction at the time of accommodation is achieved in the zoom lens system.

Here, the third lens unit 3 may include a lens element other than the third A lens unit 7 serving as a blur compensation lens unit and the third B lens unit 8 serving as a focusing lens unit. However, from the perspective of size and weight reduction in the zoom lens system, it is preferable that the third lens unit 3 is constructed only from the third A lens unit 7 and the third B lens unit 8.

Similarly to the third A lens unit 7 and the third B lens unit 8, the aperture diaphragm 5 is included in the third lens unit 3. Then, during changing the magnification, the aperture diaphragm 5, the third A lens unit 7 and the third B lens unit 8 move in the optical axis direction approximately collectively. However, in the zoom lens system according to the present Embodiment 1, the aperture diaphragm 5 is not included in the third A lens unit 7, and does not move in a direction perpendicular to the optical axis at the time of blur compensation.

As such, when the aperture diaphragm 5 is included in the third lens unit 3, the control section for the control of the shutter and the aperture diameter concerning the imaging by the zoom lens system can also be collected in the third lens unit 3. This realizes more compact construction of the zoom lens system, and reduces the assembling cost. Further, from the perspective of reduction in the outer diameter of the third A lens unit 7 serving as a blur compensation lens unit and size and weight reduction in the third A lens unit 7, it is preferable that the aperture diaphragm 5 is arranged near the third A lens unit 7. Further, from the perspective of satisfactory compensation of astigmatism, it is more preferable that the aperture diaphragm 5 is arranged on the object side of the third A lens unit 7.

In the present invention, a construction may be adopted that the aperture diaphragm is included in the third A lens unit. However, in general, the aperture diaphragm includes a member having a heavy mass such as a shutter driving actuator. Thus, it is more preferable that the aperture diaphragm is not included in the third A lens unit serving as a blur compensation lens unit, as in the zoom lens system according to the present Embodiment 1.

The third A lens unit 7 serving as a blur compensation lens unit, in order from the object side to the image side, comprises: a bi-convex positive lens element L7 in which the two surfaces 13 and 14 are aspheric; a bi-convex positive lens element L8; and a bi-concave negative lens element L9. The bi-convex positive lens element L8 and the bi-concave negative lens element L9 are cemented with each other. Further, in particular, the convex aspheric surface 13 located on the most object side and the concave surface 17 located on the most image side in the third A lens unit 7 satisfactorily compensate axial chromatic aberration, spherical aberration, coma aberration and astigmatism of the third A lens unit 7. This realizes an excellent blur compensation function in which degradation in the image formation performance is reduced. Further, the third A lens unit 7, in order from the object side to the image side, includes a positive lens element (L7) and a cemented lens element composed of a positive lens element (L8) and a negative lens element (L9). This reduces the sensitivity of image formation performance with respect to movement (decentering) in a direction perpendicular to the optical axis of each lens element, and hence reduces performance degradation caused by a fabrication error.

The third B lens unit 8 serving as a focusing lens unit is constructed only from a positive meniscus lens element L10 with the convex surface facing the object side. For the purpose of satisfactory compensation of astigmatism and reduction of the sensitivity of performance degradation due to decentering in the third B lens unit 8, the object side surface 18 of the positive meniscus lens element L10 is aspheric. As such, the third B lens unit 8 includes a lens element having an aspheric surface. This permits satisfactory compensation of spherical aberration and coma aberration of the third B lens unit 8, and realizes satisfactory focusing performance in which a change in spherical aberration caused by the object distance is reduced.

The fourth lens unit 4 is constructed only from a bi-convex positive lens element L11. The fourth lens unit 4 serves as a condenser lens for achieving telecentricity to the image sensor arranged on the image surface S. This reduces shading and realizes a bright image even in the periphery. Further, the effect of focusing is unnecessary. Thus, during changing the magnification from the wide-angle side to the telephoto side, the fourth lens unit 4 is fixed relative to the image surface S. Thus, as the structure between the fourth lens unit 4 and the image sensor, a dust-protective airtight structure can be adopted that does not permit easy entering of impurities such as fine dust and particles that cause a trouble when adhering near the image sensor. This avoids the problem of impurities that generate shadows in the shot image.

Embodiment 2

Figure 2:
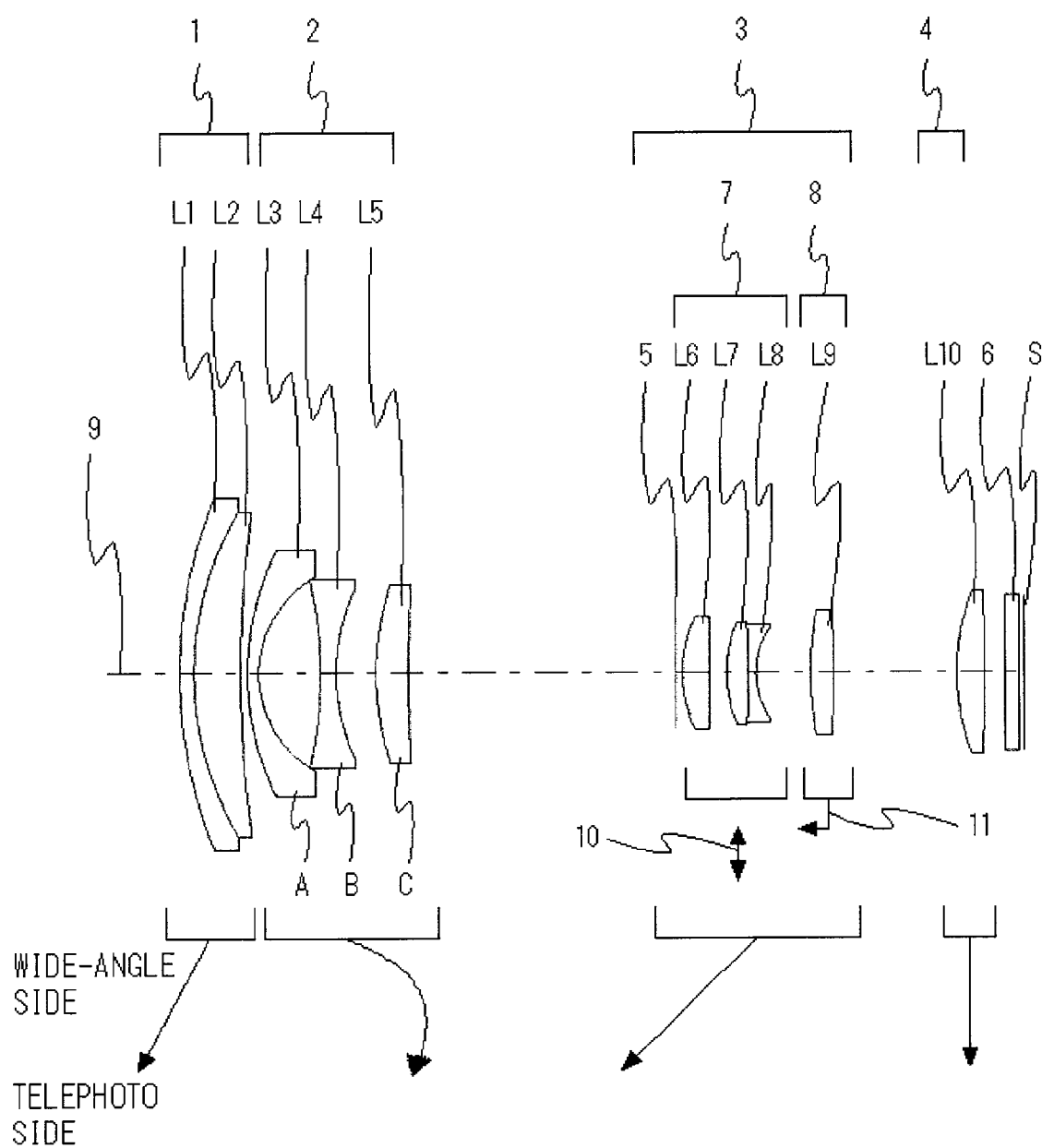
FIG. 2 is an arrangement diagram showing a lens configuration of a zoom lens system according to Embodiment 2 at a wide-angle limit in a normal state.

FIG. 2 is an arrangement diagram showing a lens configuration of a zoom lens system according to Embodiment 2 at a wide-angle limit in a normal state. The zoom lens system according to Embodiment 2, in order from the object side (left-hand side in FIG. 2) to the image side, comprises: a first lens unit 1 having positive optical power; a second lens unit 2 having negative optical power; a third lens unit 3 having positive optical power; and a fourth lens unit 4 having positive optical power. Its basic configuration and the like are the same as those of the zoom lens system according to Embodiment 1. Thus, specific configurations of the individual lens units are solely described below in details.

As shown in FIG. 2, the first lens unit 1, in order from the object side to the image side, comprises two lens elements consisting of: a negative meniscus lens element L1 with the convex surface facing the object side; and a positive meniscus lens element L2 with the convex surface facing the object side. The negative meniscus lens element L1 and the positive meniscus lens element L2 are cemented with each other. As such, the first lens unit 1 is constructed from two lens elements. Thus, satisfactory compensation of chromatic aberration and spherical aberration is achieved in the first lens unit 1 in an isolated state. Thus, a zoom lens system is realized that has a small (bright) F-number even on the telephoto side and a comparatively high resolution.

The second lens unit 2, in order from the object side to the image side, comprises: a negative meniscus lens element L3 (lens element A) with the convex surface facing the object side; a bi-concave negative lens element L4 (lens element B); and a positive meniscus lens element L5 (lens element C) that has high curvature on the object side and that has the convex surface facing the object side. Here, the lens element A is necessary for the purpose of satisfactory compensation of distortion at a wide-angle limit. The lens element C compensates chromatic aberration and astigmatism of the second lens unit 2. Further, the lens element A and the lens element C are formed from a high refractive index material having a high refractive index Nd to the d-line (see Table 4). By virtue of this, aberration generated by lens elements constituting the second lens unit 2 can be reduced, and aberration can be satisfactorily compensated, and the sensitivity of performance degradation due to decentering of the lens elements constituting the second lens unit 2 can be reduced. In particular, a tendency arises that compensation of spherical aberration and coma aberration becomes insufficient when a zoom lens system is realized having a high magnification and a large aperture as well as reduced size and weight. Therefore, for the purpose of satisfactory compensation of spherical aberration and coma aberration in the second lens unit 2, the image side surface 7 of the lens element B is aspheric.

As such, in the zoom lens system according to Embodiment 2, the second lens unit 2, in order from the object side to the image side, comprises the lens element A having negative optical power, the lens element B that has an aspheric surface and that has negative optical power, and the lens element C having positive optical power. Also, both of the lens element A and the lens element C have a refractive index to the d-line included in the specific high range as shown bellow. Therefore, in Embodiment 2, a zoom lens system can be realized having a reduced number of lens elements and a simple construction so as to achieve size and weight reduction, and still showing low sensitivity and having excellent aberration performance, in which the generation of aberration by each lens element is reduced.

The third lens unit 3 comprises an aperture diaphragm 5, a third A lens unit 7 and a third B lens unit 8. Similarly to the zoom lens system according to Embodiment 1, individual driving actuators serving as drive mechanisms are integrated into the third lens unit 3.

The third A lens unit 7 serving as a blur compensation lens unit, in order from the object side to the image side, comprises: a planer-convex lens element L6 in which the convex surface is facing the object side and the object side surface 11 is aspheric and which has positive optical power; a bi-convex positive lens element L7; and a bi-concave negative lens element L8. The bi-convex positive lens element L7 and the bi-concave negative lens element L8 are cemented with each other. Further, in particular, the convex aspheric surface 11 located on the most object side and the concave surface 15 located on the most image side in the third A lens unit 7 satisfactorily compensate axial chromatic aberration, spherical aberration, coma aberration and astigmatism of the third A lens unit 7. This realizes an excellent blur compensation function in which degradation in the image formation performance is reduced. Further, the third A lens unit 7, in order from the object side to the image side, includes a positive lens element (L6) and a cemented lens element composed of a positive lens element (L7) and a negative lens element (L8). This reduces the sensitivity of image formation performance with respect to movement (decentering) in a direction perpendicular to the optical axis of each lens element, and hence reduces performance degradation caused by a fabrication error.

The third B lens unit 8 serving as a focusing lens unit is constructed only from a bi-convex positive lens element L9. For the purpose of satisfactory compensation of astigmatism and reduction of the sensitivity of performance degradation due to decentering in the third B lens unit 8, the object side surface 16 of the bi-convex positive lens element L9 is aspheric. As such, the third B lens unit 8 includes a lens element having an aspheric surface. This permits satisfactory compensation of spherical aberration and coma aberration of the third B lens unit 8, and realizes satisfactory focusing performance in which a change in spherical aberration caused by the object distance is reduced.

The fourth lens unit 4 is constructed only from a bi-convex positive lens element L10.

Embodiment 3

Figure 3:
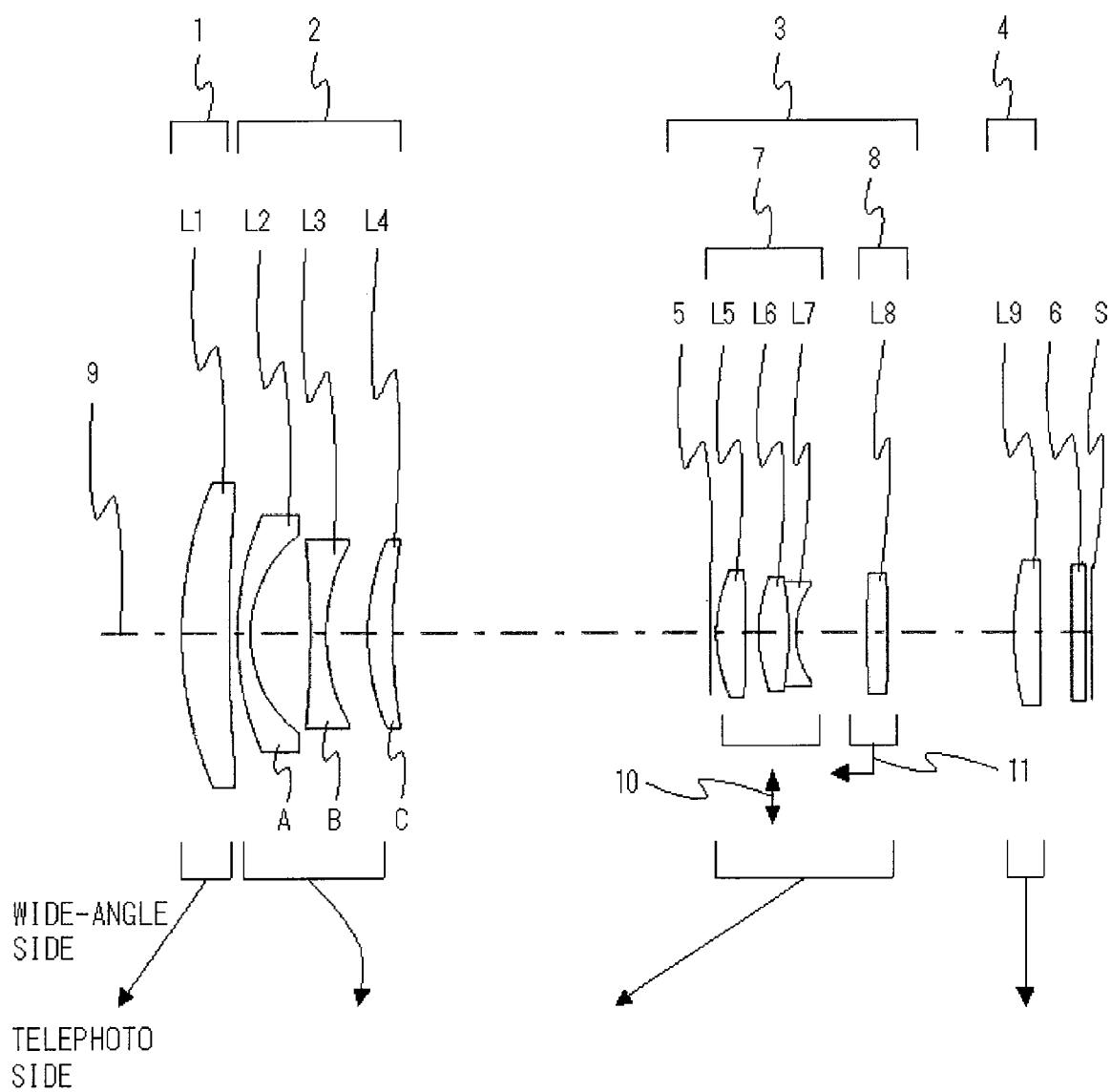
FIG. 3 is an arrangement diagram showing a lens configuration of a zoom lens system according to Embodiment 3 at a wide-angle limit in a normal state.

FIG. 3 is an arrangement diagram showing a lens configuration of a zoom lens system according to Embodiment 3 at a wide-angle limit in a normal state. The zoom lens system according to Embodiment 3, in order from the object side (left-hand side in FIG. 3) to the image side, comprises: a first lens unit 1 having positive optical power; a second lens unit 2 having negative optical power; a third lens unit 3 having positive optical power; and a fourth lens unit 4 having positive optical power. Its basic configuration and the like are the same as those of the zoom lens system according to Embodiment 1. Thus, specific configurations of the individual lens units are solely described below in details. As shown in FIG. 3, the first lens unit 1 is constructed only from a positive meniscus lens element L1 with the convex surface facing the object side. Thus, size and weight reduction is achieved in the zoom lens system.

The second lens unit 2, in order from the object side to the image side, comprises: a negative meniscus lens element L2 (lens element A) with the convex surface facing the object side; a bi-concave negative lens element L3 (lens element B); and a positive meniscus lens element L4 (lens element C) that has high curvature on the object side and that has the convex surface facing the object side. Here, the lens element A is necessary for the purpose of satisfactory compensation of distortion at a wide-angle limit. The lens element C compensates chromatic aberration and astigmatism of the second lens unit 2. Further, the lens element A and the lens element C are formed from a high refractive index material having a high refractive index Nd to the d-line (see Table 7). By virtue of this, aberration generated by lens elements constituting the second lens unit 2 can be reduced, and aberration can be satisfactorily compensated, and the sensitivity of performance degradation due to decentering of the lens elements constituting the second lens unit 2 can be reduced. In particular, a tendency arises that compensation of spherical aberration and coma aberration becomes insufficient when a zoom lens system is realized having a high magnification and a large aperture as well as reduced size and weight. Therefore, for the purpose of satisfactory compensation of spherical aberration and coma aberration in the second lens unit 2, the image side surface 6 of the lens element B is aspheric.

As such, in the zoom lens system according to Embodiment 3, the second lens unit 2, in order from the object side to the image side, comprises the lens element A having negative optical power, the lens element B that has an aspheric surface and that has negative optical power, and the lens element C having positive optical power. Also, both of the lens element A and the lens element C have a refractive index to the d-line included in the specific high range as shown bellow. Therefore, in Embodiment 3, a zoom lens system can be realized having a reduced number of lens elements and a simple construction so as to achieve size and weight reduction, and still showing low sensitivity and having excellent aberration performance, in which the generation of aberration by each lens element is reduced.

The third lens unit 3 comprises an aperture diaphragm 5, a third A lens unit 7 and a third B lens unit 8. Similarly to the zoom lens system according to Embodiment 1, individual driving actuators serving as drive mechanisms are integrated into the third lens unit 3.

The third A lens unit 7 serving as a blur compensation lens unit, in order from the object side to the image side, comprises: a bi-convex positive lens element L5 in which the object side surface 10 is aspheric; a bi-convex positive lens element L6; and a bi-concave negative lens element L7. The bi-convex positive lens element L6 and the bi-concave negative lens element L7 are cemented with each other. Further, in particular, the convex aspheric surface 10 located on the most object side and the concave surface 14 located on the most image side in the third A lens unit 7 satisfactorily compensate axial chromatic aberration, spherical aberration, coma aberration and astigmatism of the third A lens unit 7. This realizes an excellent blur compensation function in which degradation in the image formation performance is reduced. Further, the third A lens unit 7, in order from the object side to the image side, includes a positive lens element (L5) and a cemented lens element composed of a positive lens element (L6) and a negative lens element (L7). This reduces the sensitivity of image formation performance with respect to movement (decentering) in a direction perpendicular to the optical axis of each lens element, and hence reduces performance degradation caused by a fabrication error.

The third B lens unit 8 serving as a focusing lens unit is constructed only from a bi-convex positive lens element L8. For the purpose of satisfactory compensation of astigmatism and reduction of the sensitivity of performance degradation due to decentering in the third B lens unit 8, the object side surface 15 of the bi-convex positive lens element L8 is aspheric. As such, the third B lens unit 8 includes a lens element having an aspheric surface. This permits satisfactory compensation of spherical aberration and coma aberration of the third B lens unit 8, and realizes satisfactory focusing performance in which a change in spherical aberration caused by the object distance is reduced.

The fourth lens unit 4 is constructed only from a bi-convex positive lens element L9.

Next, preferable conditions are described below that are to be satisfied by a zoom lens system like that of Embodiments 1 to 3, the zoom lens system comprising a plurality of lens units including at least: a first lens unit having positive optical power; a second lens unit having negative optical power; and a third lens unit having positive optical power, wherein magnification change is performed by changing the interval between the individual lens units, and wherein the second lens unit 2, in order from the object side to the image side, comprises: the lens element A having negative optical power; the lens element B that has an aspheric surface and that has negative optical power; and the lens element C having positive optical power. Here, for the zoom lens system according to Embodiments 1 to 3, a plurality of conditions may be set forth. The construction that satisfies all the conditions is most desirable for the zoom lens system. However, when an individual condition is satisfied, a zoom lens system providing the corresponding effect can be obtained.

In the zoom lens system according to Embodiments 1 to 3, the second lens unit satisfies the following conditions (1) and (2).

$$1.85 < NdA < 2.20 \quad (1)$$

$$1.88 < NdC < 2.20 \quad (2)$$

where;

NdA is the refractive index to the d-line of the lens element A, and

NdC is the refractive index to the d-line of the lens element C.

The above conditions (1) and (2) define refractive indexes of the lens element A and the lens element C in the second lens unit, respectively.

When the value goes below the lower limit of at least even one of the conditions (1) and (2), a radius of curvature of the lens element that has the value going below the lower limit becomes small, and then aberration becomes large. The aberration of the second lens unit can be compensated at some level by the aspheric surface of the lens element B. Nevertheless, aberration generated by each lens element is not compensated and remains as it is, then this remains as the sensitivity. On the other hand, when the value exceeds the upper limit of at least even one of the conditions (1) and (2), cost of the lens elements constituting the second lens unit becomes high. In addition, transmittance on the blue-side within visible light range becomes insufficient, and then excellent color reproduction cannot be realized.

Here, the zoom lens system according to Embodiments 1 to 3, it is preferable that the second lens unit satisfies at least one of the following conditions (1a) and (2a) because low sensitivity and excellent aberration performance can be realized, in which the generation of aberration is further reduced.

$$1.90<NdA \tag{1a}$$

$$1.93<NdC \tag{2a}$$

For example, in the zoom lens system according to Embodiments 1 to 3, it is preferable that the second lens unit satisfies at least one of the following conditions (3), (4) and (5).

$$1.0<(R21+R22)/(R21-R22)<4.0 \tag{3}$$

$$-0.7<(R23+R24)/(R23-R24)<0.7 \tag{4}$$

$$-4.0<(R25+R26)/(R25-R26)<-0.9 \tag{5}$$

where;

R21 is the radius of curvature (mm) of the object side surface of the lens element A, R22 is the radius of curvature (mm) of the image side surface of the lens element A, R23 is the radius of curvature (mm) of the object side surface of the lens element B, R24 is the radius of curvature (mm) of the image side surface of the lens element B, R25 is the radius of curvature (mm) of the object side surface of the lens element C, and R26 is the radius of curvature (mm) of the image side surface of the lens element C.

The condition (3) defines a shape factor of the lens element A, and shows that the lens element A is a meniscus lens element with the convex surface facing the object side. The condition (4) defines a shape factor of the lens element B, and shows that the lens element B is a bi-concave shaped lens element. The lens element B has an aspheric surface and effectively compensates axial aberration of the second lens unit by the aspheric surface. Therefore, it is preferable that the lens element B has a construction dividing refractive power on both the object side and the image side. The condition (5) defines a shape factor of the lens element C, and shows that the lens element C is a convex shaped lens element having high curvature on the object side. The lens element C has positive optical power for the purpose of compensation of chromatic aberration, and under-compensates (insufficiently compensates) spherical aberration and astigmatism.

When the second lens unit satisfies at least one of the conditions (3), (4) and (5), compensation of aberration, from axial aberration to abaxial aberration, can be realized in a balanced manner. In particular, when the second lens unit satisfies all conditions (3), (4) and (5), more excellent compensation of aberration, from axial aberration to abaxial aberration, can be realized in a further balanced manner.

When the value goes below the lower limit of the condition (3), the lens element A becomes a bi-concave shaped lens element. In this case, a tendency arises that the generation of negative distortion due to the lens element A becomes excessive. On the other hand, when the value exceeds the upper limit of the condition (3), the generation of axial aberration due to the image side surface of the lens element A becomes large. In this case, a tendency arises that the sensitivity of the lens element A becomes high.

In the both cases that the value goes below the lower limit of the condition (4) and that it exceeds the upper limit of the condition (4), a tendency arises that the generation of aberration by the lens surfaces concentrates on the one side surface, and then the sensitivity becomes high.

When the value goes below the lower limit of the condition (5), a tendency arises that spherical aberration and astigmatism are over-compensated (excessively compensated). On the other hand, when the value exceeds the upper limit of the condition (5), a tendency arises that spherical aberration and astigmatism are under-compensated (insufficiently compensated).

Here, the zoom lens system according to Embodiments 1 to 3, it is more preferable that the second lens unit satisfies at least one of the following conditions (3a) and (3b).

$$1.6<(R21+R22)/(R21-R22) \tag{3a}$$

$$(R21+R22)/(R21-R22)<3.0 \tag{3b}$$

When the condition (3a) is satisfied, distortion in the entire lens system can be small. As a result, more excellent image showing small distortion can be obtained. On the other hand, the condition (3b) is satisfied, a surface distance between the lens element A and the lens element B becomes not too large. As a result, size and weight of the zoom lens system can be more reduced.

Here, the zoom lens system according to Embodiments 1 to 3, it is more preferable that the second lens unit satisfies the following condition (4a).

$$0.0<(R23+R24)/(R23-R24) \tag{4a}$$

When the condition (4a) is satisfied, axial aberration that is being under-compensated (insufficiently compensated) can be effectively compensated by an aspheric surface of the lens element B, mainly. At the same time, for the lens element B having the shape so that negative optical power thereof becomes small with departing from the optical axis due to the aspheric surface, repartition of paraxial optical power can be enlarged. As a result, the generation of aberration can be suitably distributed, then more excellent aberration compensation in which the sensitivity is reduced can be realized.

In the zoom lens system according to Embodiments 1 to 3, an optimal shape factor of the lens element C for the purpose of suitable compensation of spherical aberration is slightly varies depending on the refractive index of the lens element C. For example, when the refractive index NdC to the d-line of the lens element C is more than 1.93, it is more preferable that the second lens unit satisfies the following condition (5a).

$$(R25+R26)/(R25-R26)<-1.6 \tag{5a}$$

For example, in the zoom lens system according to Embodiments 1 to 3, it is preferable that the second lens unit satisfies the following condition (6).

$$0.20<|T24/FL2ALL|<0.40 \tag{6}$$

where;

T24 is a surface distance (mm) between the image side surface of the lens element B and the object side surface of the lens element C, and FL2ALL is a focal length (mm) to the d-line of the entire second lens unit.

When the lower limit of the condition (6) is satisfied, a principal distance between a negative optical power point and a positive optical power point can be elongated in the second lens unit, and optical power of the lens elements constituting the second lens unit can be further minified. Then, the generation of aberration due to each lens element in the second lens unit can be further reduced. As a result, compensation of aberration can be realized in a balanced manner, and a zoom lens system showing low sensitivity can be realized. On the other hand, it is preferable that the value exceeds the upper limit of the condition (6) in consideration of aberration compensation. Nevertheless, a thickness of the second lens unit in an optical axis direction becomes too large, and then it becomes difficult to achieve size and weight reduction of the zoom lens system.

Here, the zoom lens system according to Embodiments 1 to 3, it is more preferable that the second lens unit satisfies the following condition (6a) because compensation of aberration can be realized in a further balanced manner, and a zoom lens system having lower sensitivity can be realized.

$$0.23 < |T24/FL2ALL| \tag{6a}$$

Embodiment 4

Figure 4:
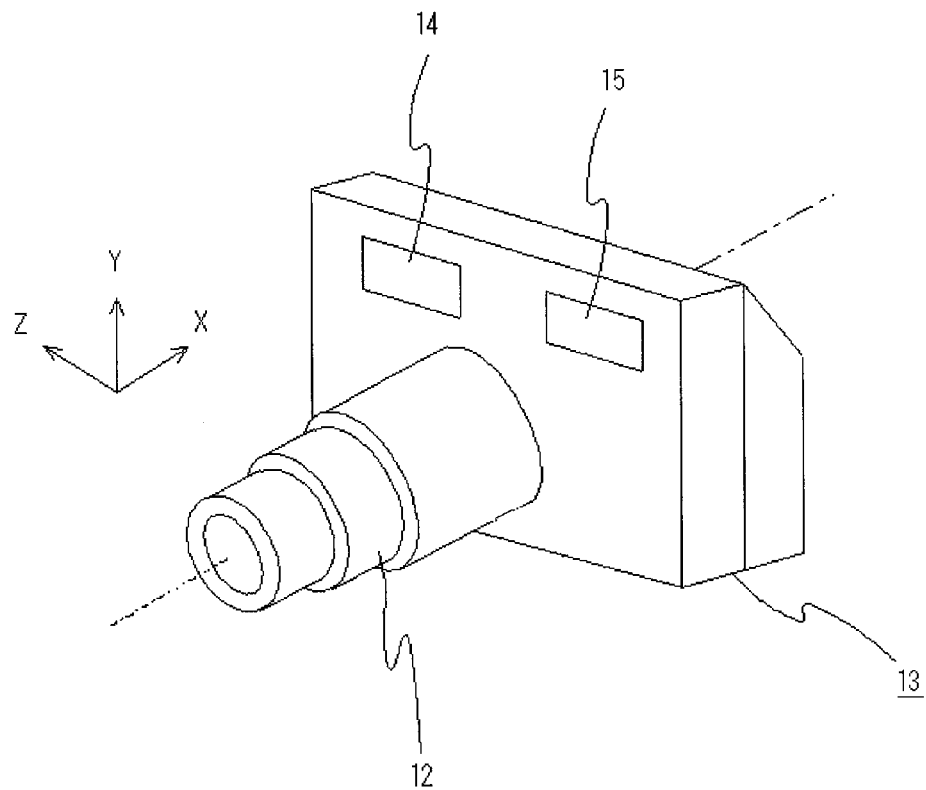
FIG. 4 is a schematic perspective view showing an example of a configuration of an imaging optical device according to Embodiment 4.

FIG. 4 is a schematic perspective view showing an example of a configuration of an imaging optical device according to Embodiment 4.

As shown in FIG. 4, the imaging optical device 13 comprises: a lens barrel 12; an image sensor (not shown) such as a CCD or a CMOS; a stroboscope 14; and an optical viewfinder 15. The lens barrel 12 holds any one of the zoom lens systems (not shown) according to Embodiments 1 to 3.

As such, the imaging optical device 13 employs any one of the zoom lens systems according to Embodiments 1 to 3. Thus, the imaging optical device 13 is provided with reduced size and weight as well as a high imaging function.

In addition to the application to a digital camera capable of shooting high resolution still images and moving images, the imaging optical device according to Embodiment 4 is applicable to, for example, a portable telephone device, a PDA (Personal Digital Assistance), a surveillance camera in a surveillance system, a Web camera, a vehicle-mounted camera and the like.

The zoom lens system according to Embodiments 1 to 3 is described below in further detail with reference to specific examples. In the examples, the units of the length in the tables are all "mm". In the tables, CR denotes the radius of curvature of the optical surface (this notation is the same also in the following formula). T denotes the optical surface interval. Nd denotes the refractive index to the d-line of the lens element. Vd denotes the Abbe number to the d-line of the lens element. Further, in the tables, "*" is given to the optical surface having an aspheric surface. The shape of the aspheric surface is defined by the following formula when the X-axis is defined toward the image side from the object side on the optical axis.

$$X = \frac{(1/CR) \cdot H^2}{1 + \sqrt{1 - (1+K) \cdot (1/CR)^2 \cdot H^2}} + \sum_n An \cdot H^n$$

$$H^2 = Y^2 + Z^2$$

Here, K denotes the conic constant, and An denotes the n-th-order aspherical coefficient.

Figure 5:
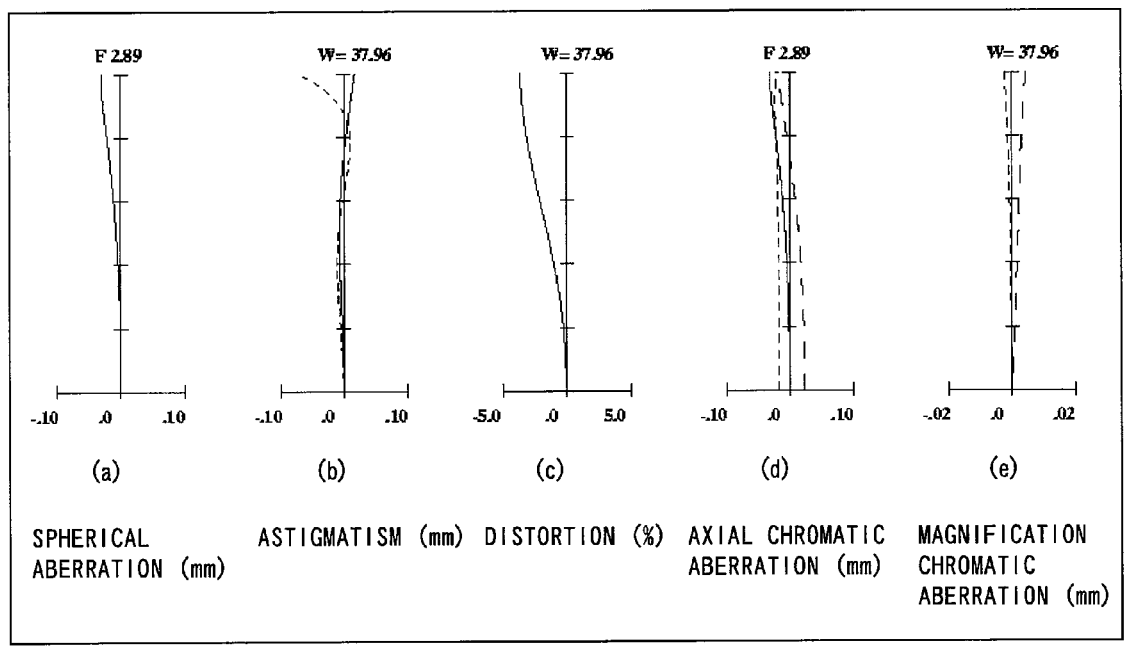
FIG. 5 is a longitudinal aberration diagram of a zoom lens system of Example 1 at an infinite object point at a wide-angle limit in a normal state.
Figure 6:
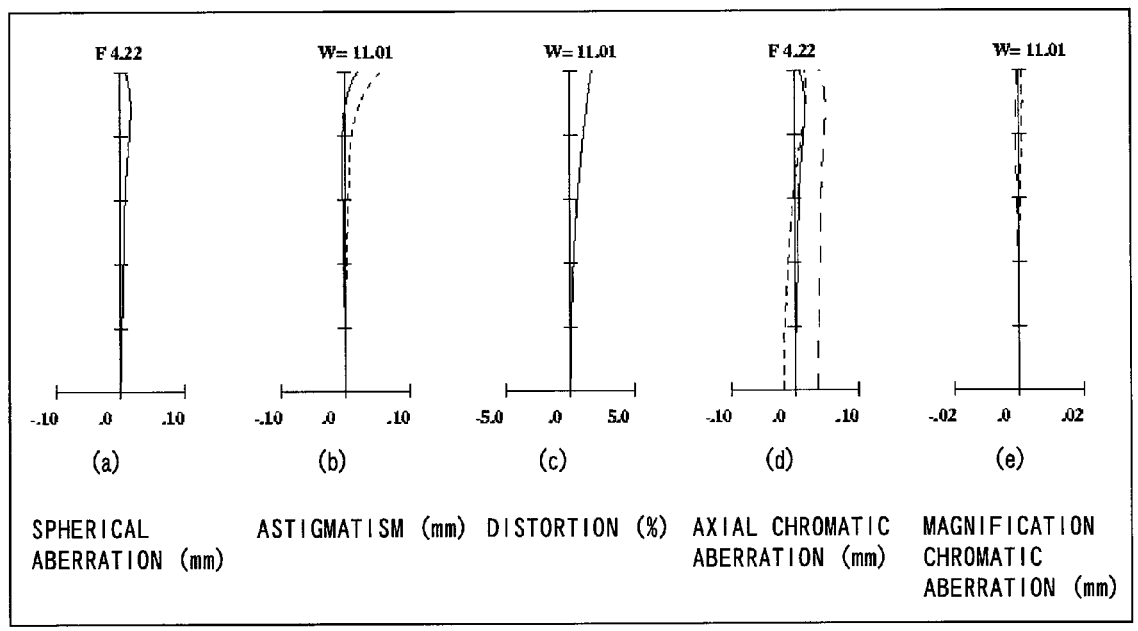
FIG. 6 is a longitudinal aberration diagram of a zoom lens system of Example 1 at an infinite object point at a telephoto limit in a normal state.
Figure 7:
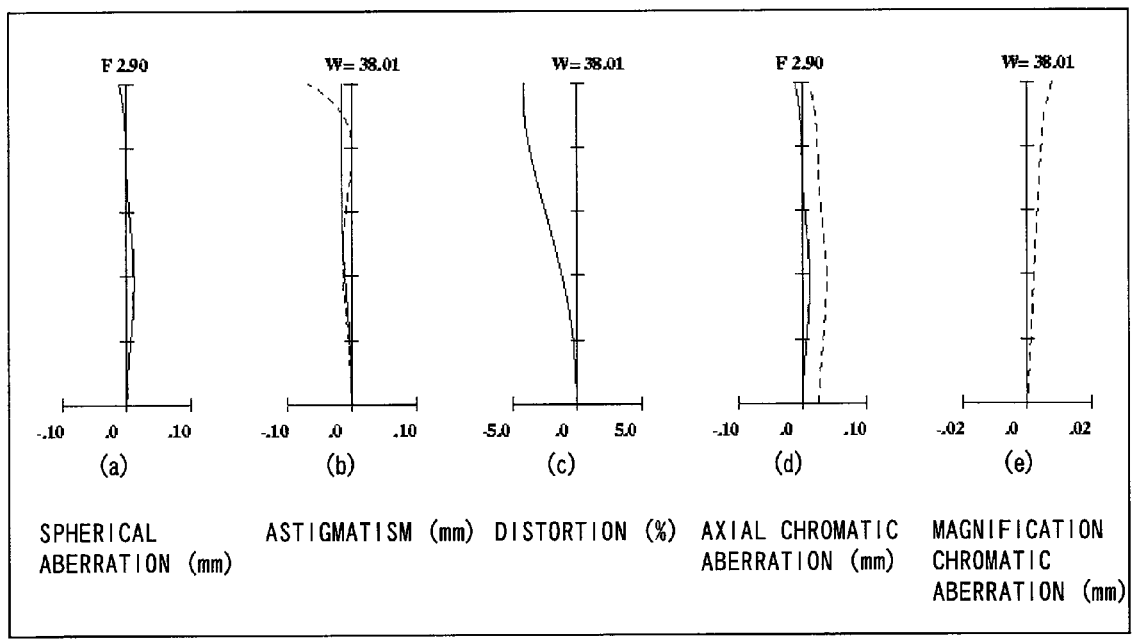
FIG. 7 is a longitudinal aberration diagram of a zoom lens system of Example 2 at an infinite object point at a wide-angle limit in a normal state.
Figure 8:
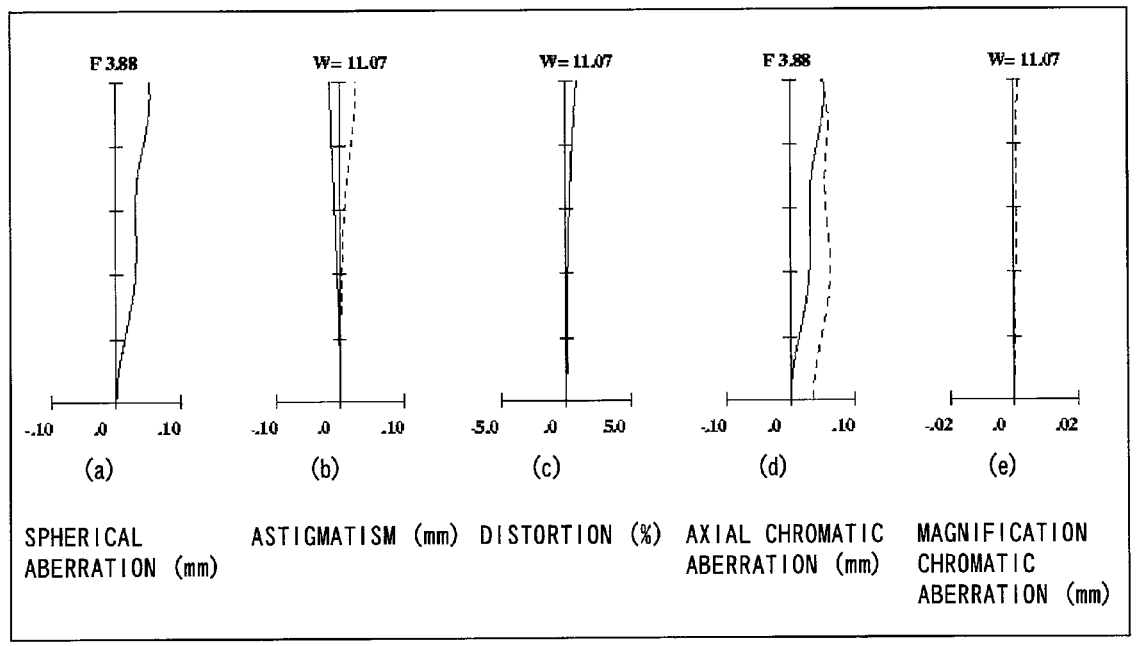
FIG. 8 is a longitudinal aberration diagram of a zoom lens system of Example 2 at an infinite object point at a telephoto limit in a normal state.
Figure 9:
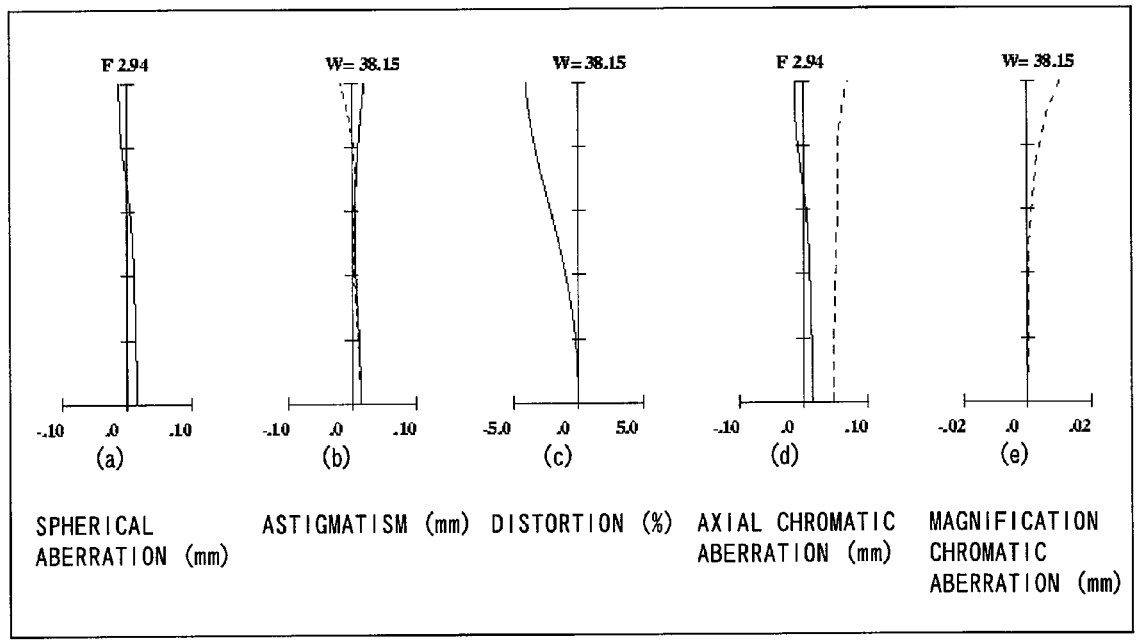
FIG. 9 is a longitudinal aberration diagram of a zoom lens system of Example 3 at an infinite object point at a wide-angle limit in a normal state.

FIG. 5 is a longitudinal aberration diagram of a zoom lens system of Example 1 at an infinite object point at a wide-angle limit in a normal state. FIG. 6 is a longitudinal aberration diagram of a zoom lens system of Example 1 at an infinite object point at a telephoto limit in a normal state. FIG. 7 is a longitudinal aberration diagram of a zoom lens system of Example 2 at an infinite object point at a wide-angle limit in a normal state. FIG. 8 is a longitudinal aberration diagram of a zoom lens system of Example 2 at an infinite object point at a telephoto limit in a normal state. FIG. 9 is a longitudinal aberration diagram of a zoom lens system of Example 3 at an infinite object point at a wide-angle limit in a normal state.

Figure 10:
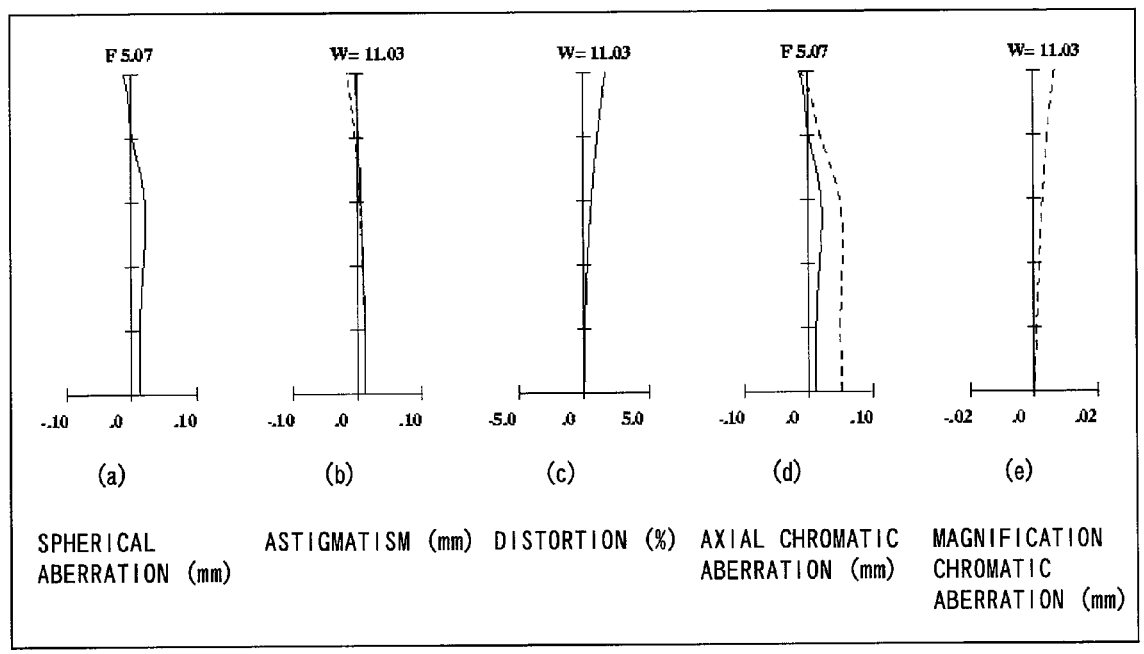
FIG. 10 is a longitudinal aberration diagram of a zoom lens system of Example 3 at an infinite object point at a telephoto limit in a normal state.

FIG. 10 is a longitudinal aberration diagram of a zoom lens system of Example 3 at an infinite object point at a telephoto limit in a normal state.

In each longitudinal aberration diagram, part (a) shows spherical aberration, part (b) shows astigmatism, part (c) shows distortion, part (d) shows axial chromatic aberration, and part (e) shows magnification chromatic aberration. In the spherical aberration diagram, the vertical axis indicates the F-number, and the solid line indicates the characteristics to the d-line. In the astigmatism diagram, the vertical axis indicates the half view angle, and the solid line and the dashed line indicate the characteristics to the sagittal image plane and the meridional image plane, respectively. In the distortion diagram, the vertical axis indicates the half view angle, and the solid line indicates the characteristics to the d-line. In the axial chromatic aberration diagram shown in FIGS. 5 and 6, the vertical axis indicates the F-number, the solid line indicates the characteristics to the d-line, the short-dashed line indicates the characteristics to the F-line, and the long-dashed line indicates the characteristics to the C-line. In the axial chromatic aberration diagram shown in FIGS. 7 to 10, the vertical axis indicates the F-number, the solid line indicates the characteristics to the d-line, and the dashed line indicates the characteristics to the g-line. In the magnification chromatic aberration diagram shown in FIGS. 5 and 6, the vertical axis indicates the half view angle ω, the short-dashed line indicates the characteristics to the F-line over the d-line, and the long-dashed line indicates the characteristics to the C-line over the d-line. In the magnification chromatic aberration diagram shown in FIGS. 7 to 10, the vertical axis indicates the half view angle ω, and the dashed line indicates the characteristics to the g-line over the d-line.

As seen from each longitudinal aberration diagram, each of the zoom lens systems of Examples 1 to 3 expresses high aberration performance at the time of normal state.

Example 1

The zoom lens system of Example 1 corresponds to the zoom lens system according to Embodiment 1. Table 1 shows the lens data of the zoom lens system of Example 1. Table 2 shows the aspherical data. Table 3 shows the data of optical surface intervals that are variable during changing the magnification. In Table 2, "D+00", "D−02" and the like indicate "×10$^{+00}$", "×10$^{-02}$" and the like, respectively.

TABLE 1

| Lens unit | Lens element | Surface | CR | T | Nd | Vd |
|---|---|---|---|---|---|---|
| 1 | L1 | 1 | 35.000 | 1.00 | 1.84666 | 23.8 |
|  | L2 | 2 | 23.286 | 2.71 | 1.71300 | 53.9 |
|  |  | 3 | 45.169 | 0.15 | 1.00000 |  |
|  | L3 | 4 | 26.610 | 2.36 | 1.77250 | 49.6 |
|  |  | 5 | 64.527 | (T1) | 1.00000 |  |
| 2 | L4(A) | 6 | 31.342 | 0.80 | 1.90366 | 31.3 |
|  |  | 7 | 7.391 | 4.00 | 1.00000 |  |
|  | L5(B) | 8 | −27.779 | 1.10 | 1.66547 | 55.2 |
|  |  | 9 | *16.754 | 2.26 | 1.00000 |  |
|  | L6(C) | 10 | 23.425 | 1.65 | 1.94595 | 18.0 |
|  |  | 11 | −1142.641 | (T2) | 1.00000 |  |
| 3 | Aperture diaphragm 5 | 12 | ∞ | 0.50 | 1.00000 |  |
| 7 | L7 | 13 | *8.372 | 2.50 | 1.74993 | 45.4 |
|  |  | 14 | *−111.164 | 1.80 | 1.00000 |  |
|  | L8 | 15 | 10.314 | 1.63 | 1.72916 | 54.7 |
|  | L9 | 16 | −8.822 | 0.50 | 1.75520 | 27.5 |
|  |  | 17 | 5.310 | (T3) | 1.00000 |  |

TABLE 1-continued

| Lens unit | Lens element | Surface | CR | T | Nd | Vd |
|---|---|---|---|---|---|---|
| 8 | L10 | 18 | *14.996 | 1.94 | 1.51835 | 70.3 |
|  |  | 19 | 57.324 | (T4) | 1.00000 |  |
| 4 | L11 | 20 | 16.832 | 1.90 | 1.71300 | 53.9 |
|  |  | 21 | −396.180 | 0.66 | 1.00000 |  |
| Optical low-pass filter 6 |  | 22 | ∞ | 2.00 | 1.51680 | 64.2 |
|  |  | 23 | ∞ | 0.00 | 1.00000 |  |

TABLE 2

| Surface | K | A4 | A6 | A8 | A10 |
|---|---|---|---|---|---|
| 9  | 6.954D−01  | −1.132D−04 | 4.474D−07 | −2.188D−08 | 2.477D−10 |
| 13 | 3.986D−01  | −2.954D−05 | 4.112D−06 | 4.971D−07  | 1.101D−08 |
| 14 | 0.000D+00  | 3.606D−04  | 7.419D−06 | 1.088D−06  | 0.000D+00 |
| 18 | −5.597D−01 | −2.246D−05 | 1.037D−06 | 3.172D−08  | 0.000D+00 |

TABLE 3

|  | T1 | T2 | T3 | T4 |
|---|---|---|---|---|
| Wide-angle (infinity)  | 0.50  | 16.09 | 4.89 | 4.01  |
| Middle (infinity)      | 5.46  | 6.52  | 5.02 | 9.25  |
| Telephoto (infinity)   | 15.67 | 2.00  | 5.50 | 12.80 |
| Wide-angle (proximity) | 0.50  | 16.09 | 4.30 | 4.60  |
| Middle (proximity)     | 5.46  | 6.52  | 4.45 | 9.82  |
| Telephoto (proximity)  | 15.67 | 2.00  | 3.73 | 14.56 |

Further, the focal length (mm), the F-number and the incident view angle (°) are as follows.

Focal length: 6.45 to 24.51

F-number: 2.9 to 4.2

Incident view angle: 76.0 to 22.0

Example 2

The zoom lens system of Example 2 corresponds to the zoom lens system according to Embodiment 2. Table 4 shows the lens data of the zoom lens system of Example 2. Table 5 shows the aspherical data. Table 6 shows the data of optical surface intervals that are variable during changing the magnification. In Table 5, "D+00", "D−02" and the like indicate "×10$^{+00}$", "×10$^{-02}$", and the like, respectively.

TABLE 4

| Lens unit | Lens element | Surface | CR | T | Nd | Vd |
|---|---|---|---|---|---|---|
| 1 | L1 | 1 | 33.000 | 1.00 | 1.84666 | 23.8 |
|   | L2 | 2 | 22.410 | 3.29 | 1.80420 | 46.5 |
|   |    | 3 | 79.339 | (T1) | 1.00000 |  |

TABLE 4-continued

| Lens unit | Lens element | Surface | CR | T | Nd | Vd |
|---|---|---|---|---|---|---|
| 2 | L3(A) | 4 | 19.697  | 0.80 | 1.90366 | 31.3 |
|   |       | 5 | 7.966   | 4.36 | 1.00000 |      |
|   | L4(B) | 6 | −29.670 | 1.10 | 1.66547 | 55.2 |
|   |       | 7 | *13.458 | 2.87 | 1.00000 |      |
|   | L5(C) | 8 | 20.453  | 2.25 | 1.94595 | 18.0 |
|   |       | 9 | 83.129  | (T2) | 1.00000 |      |

TABLE 4-continued

| Lens unit | Lens element | Surface | CR | T | Nd | Vd |
|---|---|---|---|---|---|---|
| 3 | Aperture diaphragm 5 | 10 | ∞ | 0.50 | 1.00000 |  |
|   | L6  | 11 | *9.366   | 1.88 | 1.74993 | 45.4 |
|   |     | 12 | ∞        | 1.24 | 1.00000 |      |
|   | L7  | 13 | 9.403    | 1.54 | 1.80420 | 46.5 |
|   | L8  | 14 | −58.100  | 0.50 | 1.80518 | 25.5 |
|   |     | 15 | 5.564    | (T3) | 1.00000 |      |
| 8 | L9  | 16 | *23.171  | 1.63 | 1.51835 | 70.3 |
|   |     | 17 | −50.792  | (T4) | 1.00000 |      |
| 4 | L10 | 18 | 15.883   | 1.96 | 1.49700 | 81.6 |
|   |     | 19 | −249.225 | 1.53 | 1.00000 |      |
| Optical low-pass filter6 |  | 20 | ∞ | 0.90 | 1.51680 | 64.2 |
|   |     | 21 | ∞        | 0.00 | 1.00000 |      |

TABLE 5

| Surface | K | A4 | A6 | A8 | A10 |
|---|---|---|---|---|---|
| 7  | −6.634D−01 | −4.296D−05 | 1.568D−06 | −8.500D−08 | 2.493D−09  |
| 11 | 1.617D−02  | −1.278D−04 | 9.519D−07 | −2.201D−07 | 1.243D−08  |
| 16 | −5.282D+00 | −8.687D−06 | 6.005D−07 | 1.145D−07  | −3.125D−09 |

TABLE 6

|  | T1 | T2 | T3 | T4 |
|---|---|---|---|---|
| Wide-angle (infinity)  | 0.50  | 18.70 | 3.86 | 8.67  |
| Middle (infinity)      | 8.88  | 8.36  | 4.26 | 13.48 |
| Telephoto (infinity)   | 18.96 | 2.44  | 6.00 | 19.33 |
| Wide-angle (proximity) | 0.50  | 18.70 | 3.50 | 9.04  |
| Middle (proximity)     | 8.88  | 8.36  | 3.97 | 13.77 |
| Telephoto (proximity)  | 18.96 | 2.44  | 5.03 | 20.30 |

Further, the focal length (mm), the F-number and the incident view angle (°) are as follows.

Focal length: 6.45 to 24.51

F-number: 2.9 to 4.3

Incident view angle: 76.6 to 22.2

Example 3

The zoom lens system of Example 3 corresponds to the zoom lens system according to Embodiment 3. Table 7 shows the lens data of the zoom lens system of Example 3. Table 8 shows the aspherical data. Table 9 shows the data of optical surface intervals that are variable during changing the magnification. In Table 8, "D+00", "D−02" and the like indicate "×10$^{+00}$", "×10$^{-02}$" and the like, respectively.

TABLE 7

| Lens unit | Lens element | Surface | CR | T | Nd | Vd |
|---|---|---|---|---|---|---|
| 1 | L1 | 1 | 24.670 | 2.99 | 1.48749 | 70.4 |
|   |    | 2 | 107.610 | (T1) | 1.00000 |   |
| 2 | L2(A) | 3 | 18.880 | 0.80 | 1.90366 | 31.3 |
|   |    | 4 | 7.864 | 3.79 | 1.00000 |   |
|   | L3(B) | 5 | −53.500 | 0.95 | 1.66547 | 55.2 |
|   |    | 6 | *11.254 | 2.65 | 1.00000 |   |
|   | L4(C) | 7 | 15.135 | 1.54 | 1.94595 | 18.0 |
|   |    | 8 | 34.200 | (T2) | 1.00000 |   |
| 3 | Aperture diaphragm 5 | 9 | ∞ | 0.30 | 1.00000 |   |
| 7 | L5 | 10 | *9.018 | 1.85 | 1.74993 | 45.4 |
|   |    | 11 | −78.250 | 0.84 | 1.00000 |   |
|   | L6 | 12 | 10.130 | 1.88 | 1.72916 | 54.7 |
|   | L7 | 13 | −19.240 | 0.45 | 1.75520 | 27.5 |
|   |    | 14 | 5.360 | (T3) | 1.00000 |   |
| 8 | L8 | 15 | *49.665 | 1.30 | 1.66547 | 55.2 |
|   |    | 16 | −60.700 | (T4) | 1.00000 |   |
| 4 | L9 | 17 | 19.991 | 1.68 | 1.71300 | 53.9 |
|   |    | 18 | −190.000 | 1.92 | 1.00000 |   |
| Optical low-pass filter 6 |   | 19 | ∞ | 0.90 | 1.51680 | 64.2 |
|   |    | 20 | ∞ | 0.00 | 1.00000 |   |

TABLE 8

| Surface | K | A4 | A6 | A8 | A10 |
|---|---|---|---|---|---|
| 6 | −2.573D−01 | −4.352D−05 | 1.712D−06 | −7.264D−08 | 1.616D−09 |
| 10 | −1.052D−01 | −1.421D−04 | −1.899D−06 | 2.249D−07 | −2.020D−08 |
| 15 | −9.796D−01 | −3.373D−05 | 7.035D−07 | 3.491D−08 | 0.000D+00 |

TABLE 9

|   | T1 | T2 | T3 | T4 |
|---|---|---|---|---|
| Wide-angle (infinity) | 0.50 | 19.87 | 4.47 | 7.93 |
| Middle (infinity) | 7.57 | 8.67 | 4.89 | 14.20 |
| Telephoto (infinity) | 13.01 | 3.20 | 6.00 | 22.65 |
| Wide-angle (proximity) | 0.50 | 19.87 | 4.33 | 8.06 |
| Middle (proximity) | 7.57 | 8.67 | 4.47 | 14.62 |
| Telephoto (proximity) | 13.01 | 3.20 | 4.87 | 23.78 |

Further, the focal length (mm), the F-number and the incident view angle (°) are as follows.

Focal length: 6.45 to 24.50

F-number: 2.9 to 5.0

Incident view angle: 76.3 to 22.1

The following Table 10 shows values corresponding to each condition.

TABLE 10

|   | Condition | Example 1 | Example 2 | Example 3 |
|---|---|---|---|---|
| (1) | NdA | 1.90366 | 1.90366 | 1.90366 |
| (2) | NdC | 1.94595 | 1.94595 | 1.94595 |
| (3) | (R21 + R22)/(R21 − R22) | 1.617 | 2.358 | 2.428 |
| (4) | (R23 + R24)/(R23 − R24) | 0.248 | 0.376 | 0.652 |
| (5) | (R25 + R26)/(R25 − R26) | −0.960 | −1.653 | −2.588 |
| (6) | |T24/FL2ALL| | 0.238 | 0.282 | 0.259 |

INDUSTRIAL APPLICABILITY

The zoom lens system according to the present invention has a reduced number of lens elements and a simple construction so as to achieve size and weight reduction, and still shows low sensitivity and has excellent aberration performance, in which the generation of aberration by each lens element is reduced. Thus, this zoom lens system is useful, for example, for an imaging optical device such as a high-performance digital camera in which size and weight reduction is desired.

The invention claimed is:

1. A zoom lens system comprising a plurality of lens units, in order from an object side to an image side, including at least:

a first lens unit having positive optical power;

a second lens unit having negative optical power; and a third lens unit having positive optical power, wherein magnification change is performed by changing an interval between the individual lens units, wherein the first lens unit moves relative to an image surface during changing the magnification from a wide-angle side to a telephoto side, wherein the second lens unit, in order from the object side to the image side, comprises:

a lens element A having negative optical power;

a lens element B that has an aspheric surface and has negative optical power; and a lens element C having positive optical power, wherein both surfaces of the lens element B have a radius of curvature other than infinity, and wherein the second lens unit satisfies the following conditions (1) and (2):

$$1.85 < NdA < 2.20 \quad (1)$$

$$1.88 < NdC < 2.20 \quad (2),$$

where:

NdA is the refractive index to the d-line of the lens element A, and

NdC is the refractive index to the d-line of the lens element C.

2. The zoom lens system as claimed in claim 1, wherein the second lens unit satisfies at least one of the following conditions (3), (4) and (5):

$$1.0<(R21+R22)/(R21-R22)<4.0 \quad (3)$$

$$-0.7<(R23+R24)/(R23-R24)<0.7 \quad (4)$$

$$-4.0<(R25+R26)/(R25-R26)<-0.9 \quad (5),$$

where:
R21 is the radius of curvature of the object side surface of the lens element A,
R22 is the radius of curvature of the image side surface of the lens element A,
R23 is the radius of curvature of the object side surface of the lens element B,
R24 is the radius of curvature of the image side surface of the lens element B,
R25 is the radius of curvature of the object side surface of the lens element C, and
R26 is the radius of curvature of the image side surface of the lens element C.

3. The zoom lens system as claimed in claim 2, wherein the second lens unit satisfies all of the following conditions (3), (4) and (5):

$$1.0<(R21+R22)/(R21-R22)<4.0 \quad (3)$$

$$-0.7<(R23+R24)/(R23-R24)<0.7 \quad (4)$$

$$-4.0<(R25+R26)/(R25-R26)<-0.9 \quad (5),$$

where:
R21 is the radius of curvature of the object side surface of the lens element A,
R22 is the radius of curvature of the image side surface of the lens element A,
R23 is the radius of curvature of the object side surface of the lens element B,
R24 is the radius of curvature of the image side surface of the lens element B,
R25 is the radius of curvature of the object side surface of the lens element C, and
R26 is the radius of curvature of the image side surface of the lens element C.

4. The zoom lens system as claimed in claim 1, wherein the second lens unit satisfies the following condition (6):

$$0.20<|T24/FL2ALL|<0.40 \quad (6),$$

where:
T24 is a surface distance between the image side surface of the lens element B and the object side surface of the lens element C, and
FL2ALL is a focal length to the d-line of the entire second lens unit.

5. The zoom lens system as claimed in claim 1, wherein the third lens unit moves relative to the image surface during changing the magnification from the wide-angle side to the telephoto side.

6. The zoom lens system as claimed in claim 1, wherein the second lens unit once moves to the image side and then moves to the object side with locus of a convex to the image surface during changing the magnification from the wide-angle side to the telephoto side.

7. A zoom lens system comprising a plurality of lens units, in order from an object side to an image side, including at least:
a first lens unit having positive optical power;
a second lens unit having negative optical power; and
a third lens unit having positive optical power, wherein
magnification change is performed by changing an interval between the individual lens units, wherein
the second lens unit once moves to the image side and then moves to the object side with locus of a convex to an image surface during changing the magnification from a wide-angle side to a telephoto side, wherein
the second lens unit, in order from the object side to the image side, comprises:
a lens element A having negative optical power;
a lens element B that has an aspheric surface and has negative optical power; and
a lens element C having positive optical power, wherein
both surfaces of the lens element B have a radius of curvature other than infinity, and wherein
the second lens unit satisfies the following conditions (1) and (2):

$$1.85<NdA<2.20 \quad (1)$$

$$1.88<NdC<2.20 \quad (2),$$

where:
NdA is the refractive index to the d-line of the lens element A, and
NdC is the refractive index to the d-line of the lens element C.

8. The zoom lens system as claimed in claim 7, wherein the second lens unit satisfies at least one of the following conditions (3), (4) and (5):

$$1.0<(R21+R22)/(R21-R22)<4.0 \quad (3)$$

$$-0.7<(R23+R24)/(R23-R24)<0.7 \quad (4)$$

$$-4.0<(R25+R26)/(R25-R26)<-0.9 \quad (5),$$

where:
R21 is the radius of curvature of the object side surface of the lens element A,
R22 is the radius of curvature of the image side surface of the lens element A,
R23 is the radius of curvature of the object side surface of the lens element B,
R24 is the radius of curvature of the image side surface of the lens element B,
R25 is the radius of curvature of the object side surface of the lens element C, and
R26 is the radius of curvature of the image side surface of the lens element C.

9. The zoom lens system as claimed in claim 8, wherein the second lens unit satisfies all of the following conditions (3), (4) and (5):

$$1.0<(R21+R22)/(R21-R22)<4.0 \quad (3)$$

$$-0.7<(R23+R24)/(R23-R24)<0.7 \quad (4)$$

$$-4.0<(R25+R26)/(R25-R26)<-0.9 \quad (5),$$

where:
R21 is the radius of curvature of the object side surface of the lens element A,
R22 is the radius of curvature of the image side surface of the lens element A,
R23 is the radius of curvature of the object side surface of the lens element B,
R24 is the radius of curvature of the image side surface of the lens element B,
R25 is the radius of curvature of the object side surface of the lens element C, and R26 is the radius of curvature of the image side surface of the lens element C.

10. The zoom lens system as claimed in claim 7, wherein the second lens unit satisfies the following condition (6):

$$0.20<|T24/FL2ALL|<0.40 \tag{6}$$

where:
T24 is a surface distance between the image side surface of the lens element B and the object side surface of the lens element C, and
FL2ALL is a focal length to the d-line of the entire second lens unit.

11. The zoom lens system as claimed in claim 7, wherein the third lens unit moves relative to the image surface during changing the magnification from the wide-angle side to the telephoto side.

12. An imaging optical device comprising:
an imaging optical system for forming an optical image of an object; and
an image sensor for converting the optical image formed by the imaging optical system into an electric image signal; wherein
the imaging optical system is a zoom lens system comprising a plurality of lens units, in order from an object side to an image side, including at least:
a first lens unit having positive optical power;
a second lens unit having negative optical power; and
a third lens unit having positive optical power, wherein
magnification change is performed by changing an interval between the individual lens units, wherein
the first lens unit moves relative to an image surface during changing the magnification from a wide-angle side to a telephoto side, wherein
the second lens unit, in order from the object side to the image side, comprises:
a lens element A having negative optical power;
a lens element B that has an aspheric surface and has negative optical power; and
a lens element C having positive optical power, wherein
both surfaces of the lens element B have a radius of curvature other than infinity, and wherein
the second lens unit satisfies the following conditions (1) and (2):

$$1.85<NdA<2.20 \tag{1}$$

$$1.88<NdC<2.20 \tag{2}$$

where:
NdA is the refractive index to the d-line of the lens element A, and
NdC is the refractive index to the d-line of the lens element C.

13. An imaging optical device comprising:
an imaging optical system for forming an optical image of an object; and
an image sensor for converting the optical image formed by the imaging optical system into an electric image signal; wherein
the imaging optical system is a zoom lens system comprising a plurality of lens units, in order from an object side to an image side, including at least:
a first lens unit having positive optical power;
a second lens unit having negative optical power; and
a third lens unit having positive optical power, wherein
magnification change is performed by changing an interval between the individual lens units, wherein
the second lens unit once moves to the image side and then moves to the object side with locus of a convex to an image surface during changing the magnification from a wide-angle side to a telephoto side, wherein
the second lens unit, in order from the object side to the image side, comprises:
a lens element A having negative optical power;
a lens element B that has an aspheric surface and has negative optical power; and
a lens element C having positive optical power, wherein
both surfaces of the lens element B have a radius of curvature other than infinity, and wherein
the second lens unit satisfies the following conditions (1) and (2):

$$1.85<NdA<2.20 \tag{1}$$

$$1.88<NdC<2.20 \tag{2}$$

where:
NdA is the refractive index to the d-line of the lens element A, and
NdC is the refractive index to the d-line of the lens element C.

\* \* \* \* \*

UNITED STATES PATENT AND TRADEMARK OFFICE
CERTIFICATE OF CORRECTION

PATENT NO. : 7,675,691 B2  
APPLICATION NO. : 11/996193  
DATED : March 9, 2010  
INVENTOR(S) : Kyoichi Miyazaki It is certified that error appears in the above-identified patent and that said Letters Patent is hereby corrected as shown below:

Title Page,  
In Item "(30) Foreign Application Priority Data" please change  
"JP 2006-208894"  
to  
--JP 2005-208894--.

Signed and Sealed this

Eighth Day of June, 2010

David J. Kappos  
*Director of the United States Patent and Trademark Office*